United States Patent
Tsuda et al.

(10) Patent No.: US 9,449,375 B2
(45) Date of Patent: Sep. 20, 2016

(54) IMAGE PROCESSING APPARATUS, IMAGE PROCESSING METHOD, PROGRAM, AND RECORDING MEDIUM

(71) Applicant: MITSUBISHI ELECTRIC CORPORATION, Tokyo (JP)

(72) Inventors: Yuka Tsuda, Tokyo (JP); Nobuhiko Yamagishi, Tokyo (JP); Tomonori Fukuta, Tokyo (JP); Isao Otsuka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/759,129

(22) PCT Filed: Oct. 23, 2013

(86) PCT No.: PCT/JP2013/078643
§ 371 (c)(1),
(2) Date: Jul. 2, 2015

(87) PCT Pub. No.: WO2014/119060
PCT Pub. Date: Aug. 7, 2014

(65) Prior Publication Data
US 2015/0339808 A1 Nov. 26, 2015

(30) Foreign Application Priority Data

Jan. 31, 2013 (JP) ................................ 2013-017241

(51) Int. Cl.
*G06K 9/00* (2006.01)
*G06T 5/00* (2006.01)
*G06T 5/40* (2006.01)

(52) U.S. Cl.
CPC *G06T 5/009* (2013.01); *G06T 5/40* (2013.01)

(58) Field of Classification Search
USPC .......... 382/167, 162, 168, 312; 345/87, 204; 348/222.1, 254, E5.034, E5.133; 358/518, 520
See application file for complete search history.

(56) References Cited

U.S. PATENT DOCUMENTS 6,151,410 A 11/2000 Kuwata et al.
6,323,959 B1 * 11/2001 Toyama ................. H04N 1/482
358/518

(Continued)

FOREIGN PATENT DOCUMENTS

JP 10-271524 A 10/1998
JP 2000-32287 A 1/2000

(Continued)

*Primary Examiner* — Anh Do
(74) *Attorney, Agent, or Firm* — Birch, Stewart, Kolasch & Birch, LLP

(57) ABSTRACT

In an image processing apparatus, maximum values and minimum values of the classes of respective color components are calculated; the largest value among the maximum values of the color components is found as an all-color maximum value, color correction curves are generated, on the basis of the maximum and minimum values of the respective color components and the all-color maximum value, for color components other than the color component whose maximum value is equal to the all-color maximum value, and the color correction curves are used to perform corrections on the respective color components of the image signal. The color correction curves are generated for performing corrections such that, after the corrections, the maximum value of each color component is approximately equal to the all-color maximum value. Alternatively, the color correction curves are generated for performing corrections such that, after the corrections, the minimum value of each color component is approximately equal to an all-color minimum value. Color casts arising from lighting effects at the time of imaging are corrected, and image contrast can be heightened.

13 Claims, 12 Drawing Sheets

(56) References Cited

U.S. PATENT DOCUMENTS

| | | | |
|---|---|---|---|
| 6,643,397 B1 | 11/2003 | Kanamori | |
| 6,850,214 B2 * | 2/2005 | Nishitani | G09G 3/3406 345/204 |
| 7,352,398 B2 * | 4/2008 | Sano | H04N 5/235 348/222.1 |
| 7,432,897 B2 * | 10/2008 | Nishitani | G09G 3/3406 345/204 |
| 8,090,198 B2 * | 1/2012 | Yoshii | G06T 5/009 358/518 |
| 8,125,427 B2 * | 2/2012 | Nishitani | G09G 3/3406 345/204 |
| 2006/0110033 A1 | 5/2006 | Toshihiro | |
| 2009/0052774 A1 | 2/2009 | Yoshii et al. | |

FOREIGN PATENT DOCUMENTS

| | | | | |
|---|---|---|---|---|
| JP | 2001-94810 A | 4/2001 | | |
| JP | 2001-229374 A | 8/2001 | | |
| JP | 2002-101313 A | 4/2002 | | |
| JP | 2003-51947 A | 2/2003 | | |
| JP | 2006-128986 A | 5/2006 | | |
| JP | 2006128986 A | * 5/2006 | ............... | H04N 1/46 |
| JP | 2006-148754 A | 6/2006 | | |
| JP | 2008-245116 A | 10/2008 | | |
| JP | 2009-301090 A | 12/2009 | | |
| JP | 4447035 B2 | 4/2010 | | |
| WO | WO 2014/064916 A1 | 5/2014 | | |

* cited by examiner

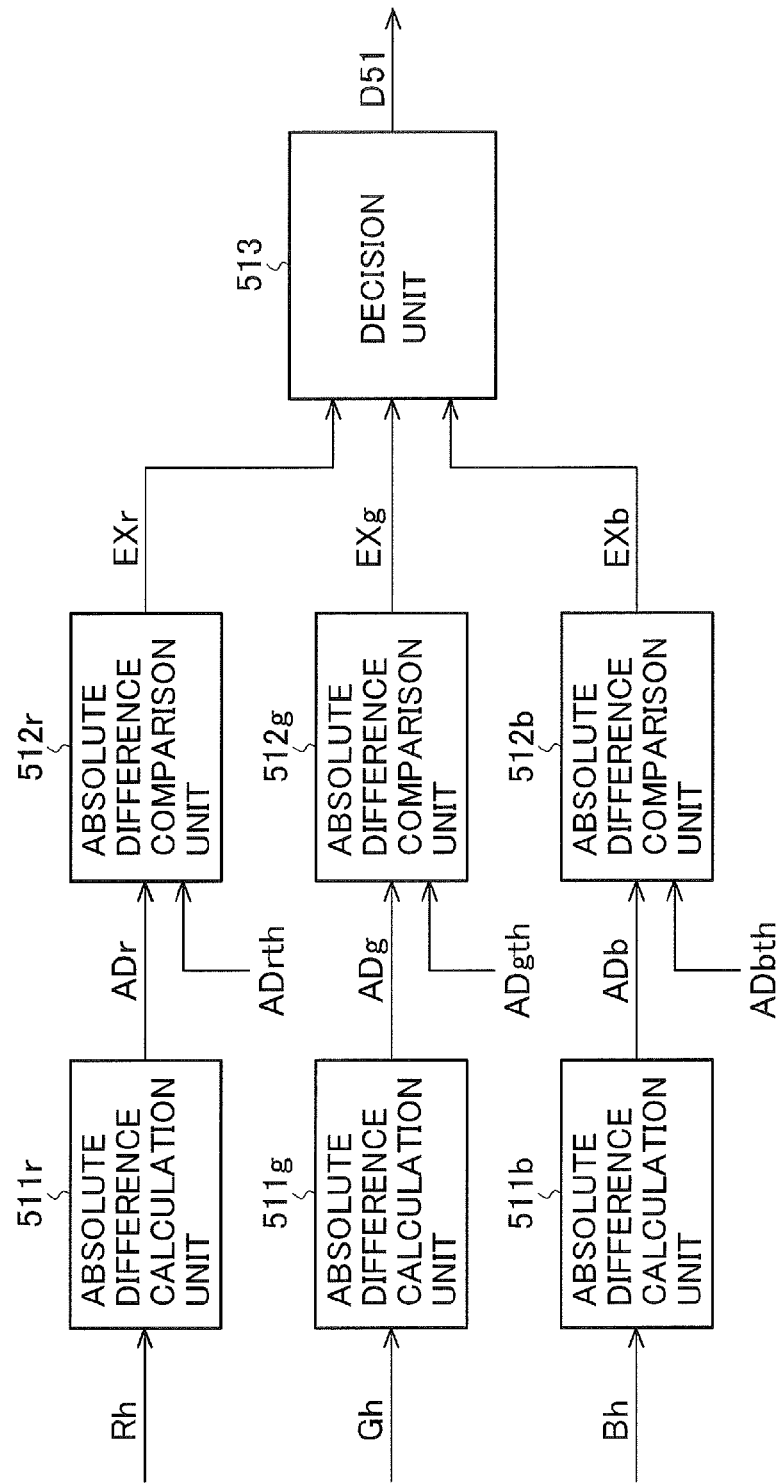

IMAGE PROCESSING APPARATUS, IMAGE PROCESSING METHOD, PROGRAM, AND RECORDING MEDIUM

TECHNICAL FIELD

The present invention relates to an image processing apparatus and an image processing method that are capable of controlling the gradations of an image. The invention also relates to a program for causing a computer to execute the image processing method, and to a recording medium storing the program.

BACKGROUND ART

To heighten image contrast, gradation corrections that calculate the maximum and minimum values of the gradations of each color component of an image signal having a plurality of color components for each pixel in the image, and set the maximum value and the minimum value calculated for each color component to the maximum value and the minimum value of the dynamic range of the gradation scale in the image signal system of the corrected image are carried out (see, for example, patent reference 1 and patent reference 2).

PRIOR ART REFERENCES

Patent References

Patent reference 1: Japanese patent application publication No. 2006-128986 (page 6, FIGS. 1 and 9)
Patent reference 2: Japanese patent No. 4447035 (page 5, FIGS. 4 and 5)

SUMMARY OF THE INVENTION

Problems to be Solved by the Invention

A problem is that if the gradations are corrected by setting the gradation maximum value of each color component to the maximum value of the dynamic range of the gradation scale of the image signal system and the gradation minimum value of each color component to the minimum value of the dynamic range of the gradation scale of each color component as is conventionally done, there will be pixels in the image at which the gradation value of one color component increases and the gradation value of another color component decreases, and the changes in coloration will not be uniform. For example, while one part of the image loses its reddish look another part may take on a cyan look and yet another part may take on a yellowish look.

The reason for this is that the change in color differs depending on whether the gradation value of a color component is increased or decreased. Increasing the R component, for example, causes a change to red; decreasing the R component causes a change to the opposite color, which is cyan. Another problem is that if the gradations are corrected so that the ratios of the color components do not change, the correction cannot remove a color cast of the entire image, and contrast cannot be adequately heightened.

The present invention addresses these problems and its object is to heightening image contrast while also performing color corrections to correct a color cast of the image.

Means for Solving the Problem

An image processing apparatus according to one aspect of the invention comprising:

a gradation histogram calculation unit for calculating gradation histograms of respective color components of an image signal including a plurality of color components and forming a single image;

a maximum/minimum calculation unit for calculating a maximum value and a minimum value of classes of each color component by using the gradation histogram of each color component;

a color correction curve generating unit for finding, as an all-color maximum value, a largest value among the maximum values calculated by the maximum/minimum calculation unit for the respective color components and, on a basis of the maximum values and the minimum values of the respective color components and the all-color maximum value, generating color correction curves for the color components other than the color component whose maximum value is equal to the all-color maximum value; and a color correction unit for performing corrections on the respective color components of the image signal by using the color correction curves; wherein the color correction curve generating unit generates the color correction curves for performing corrections such that, after the corrections, the maximum value of each color component is substantially equal to the all-color maximum value.

An image processing apparatus according to another aspect of the invention comprises:

a gradation histogram calculation unit for calculating gradation histograms of respective color components of an image signal including a plurality of color components and forming a single image;

a maximum/minimum calculation unit for calculating a maximum value and a minimum value of classes of each color component by using the gradation histogram of each color component;

a color correction curve generating unit for finding, as an all-color minimum value, a smallest value among the minimum values calculated by the maximum/minimum calculation unit for the respective color components and, on a basis of the maximum values and the minimum values of the respective color components and the all-color minimum value, generating color correction curves for the color components other than the color component whose minimum value is equal to the all-color minimum value; and a color correction unit for performing corrections on the respective color components of the image signal by using the color correction curves; wherein the color correction curve generating unit generates the color correction curves for performing corrections such that, after the corrections, the minimum value of each color component is substantially equal to the all-color minimum value.

Effect of the Invention

Since the present invention generates the color correction curves from the gradation histograms of respective color components to correct color casts, it can correct color casts arising from lighting effects at the time of imaging and also heighten image contrast.

BRIEF DESCRIPTION OF THE DRAWINGS

FIG. 9 is a block diagram showing an example of the uniform region detection unit in FIG. 8.

MODE FOR CARRYING OUT THE INVENTION

First Embodiment

Figure 1:
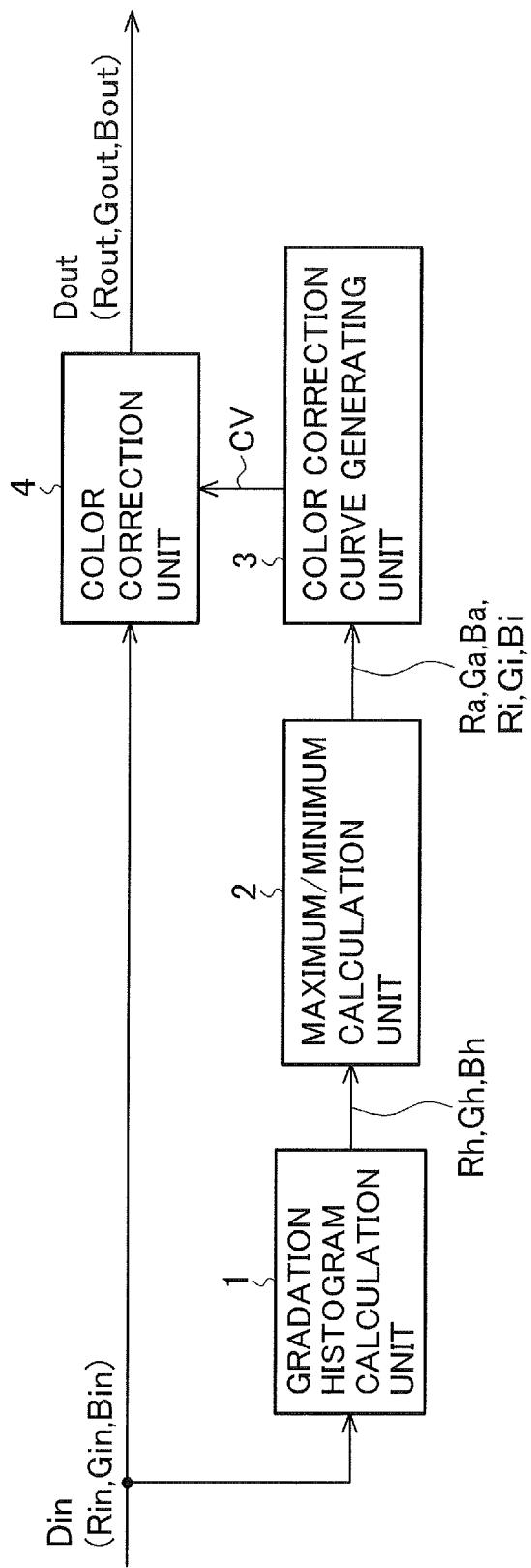
FIG. 1 is a block diagram of an image processing apparatus according to a first embodiment of the invention.

FIG. 1 shows the structure of an image processing apparatus according to a first embodiment of the invention. The illustrated image processing apparatus includes a gradation histogram calculation unit 1, a maximum/minimum calculation unit 2, a color correction curve generating unit 3, and a color correction unit 4.

The input image signal Din is an image signal that includes a plurality of color components, forming an image.

The gradation histogram calculation unit 1 calculates gradation histograms as gradation distribution information for respective color components of the input image signal Din and outputs the gradation histograms for the respective color components to the maximum/minimum calculation unit 2.

Using the gradation histogram for each color component input from the gradation histogram calculation unit 1, the maximum/minimum calculation unit 2 calculates the maximum value and the minimum value of the gradations in the gradation histogram for each color component and outputs the results to the color correction curve generating unit 3.

On the basis of the maximum values and the minimum values input from the maximum/minimum calculation unit 2 for the respective color components, the color correction curve generating unit 3 generates color correction curves CV and outputs the color correction curves CV to the color correction unit 4.

The color correction unit 4 uses the input image signal Din and the color correction curves CV input from the color correction curve generating unit 3 to convert (correct) the gradations of the input image signal Din, and outputs the converted image signal Dout.

The case in which the input image signal Din consists of an R component signal (R signal) Rin, a G component signal (G signal) Gin, and a B component signal (B signal) Bin and the corrected image signal consists of an R signal Rout, a G signal Gout, and a B signal Bout will now be described. The intensities of the components are represented by 256 gradations from 0 to 255.

The input image signal Din is input to the gradation histogram calculation unit 1 and the color correction unit 4.

The gradation histogram calculation unit 1 creates a gradation histogram for each of the R, G, and B color components in the input image signal Din that has been input. A gradation histogram indicates the frequencies of classes each consisting of one gradation value or two or more consecutive gradation values (the number of pixels having those gradation values, within the image of one frame).

Since a gradation histogram is created for each color component, the gradation histogram calculation unit 1 calculates as many gradation histograms as the number of color components.

If the number of gradation values included in each class in the gradation histogram (the width of each class) is two or more, a power of two such as 2, 4, 8, or 16 is advantageous because it reduces the amount of computation.

Class widths with values closer to 1 enable more faithful color correction of the input image. It is however advantageous to increase the class width in order to reduce the memory capacity required for storing gradation histograms and reduce the amount of computation.

The mean or median of the gradation values in each class in a gradation histogram is used as a representative value of the class; the values of the classes (their class values) are expressed by their representative values, which means that a class including larger gradation values is a larger class (a class having a larger class value).

The gradation histograms for the respective color components output from the gradation histogram calculation unit 1, that is, the R component gradation histogram Rh, the G component gradation histogram Gh, and the B component gradation histogram Bh, are output to the maximum/minimum calculation unit 2.

The maximum/minimum calculation unit 2 calculates the gradation maximum value and the gradation minimum value in the gradation histogram for each color component output from the gradation histogram calculation unit 1.

Figure 2:
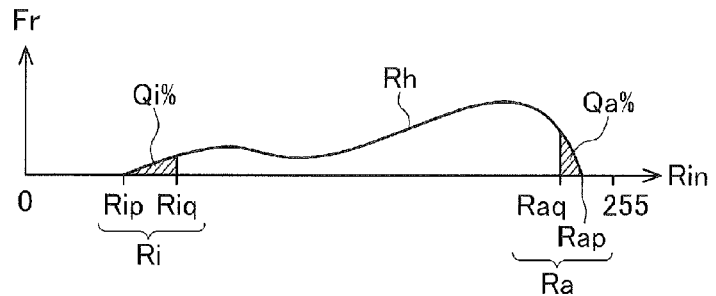
FIG. 2 is a diagram showing an exemplary gradation histogram of the R component calculated by the gradation histogram calculation unit in FIG. 1.

An exemplary gradation histogram Rh of the R component is shown in FIG. 2. In FIG. 2 the horizontal axis represents the class Cr and the vertical axis represents the frequency Fr (the number or proportion of pixels having gradation values belonging to the class).

The maximum/minimum calculation unit 2 determines the gradation maximum value Ra and the gradation minimum value Ri in the gradation histogram Rh of the R component and outputs the results.

The gradation maximum value Ra and the gradation minimum value Ri in the gradation histogram Rh are determined as follows.

For example, among the classes in the gradation histogram Rh whose frequency Fr is 1 or more, the representative value Rap of the class with the largest value (class value) Cr is used as the gradation maximum value Ra of the histogram Rh.

Similarly, among the classes in the gradation histogram Rh whose frequency Fr is 1 or more, the representative value Rip of the class with the smallest value (class value) Cr is used as the gradation minimum value Ri of the histogram Rh.

Instead of using the value Rap, it is also possible to cumulatively sum the frequencies of the classes in the gradation histogram Rh of the R component, proceeding from the maximum class toward the minimum class, and use the representative value Raq of the class at which the cumulative sum attains a given proportion (a predetermined fraction), such as Qa %, for example, of the number of pixels in the input image, as the gradation maximum value Ra.

When this is done, even if the signal Rin includes noise, the noise effects can be removed, and the essential maximum value of the color component can be obtained. The value of Qa % can be set in the range from 1% to 5%, for example. As the value of Qa increases, the slope of the color correction curve, described later, increases, so that the improvement effect of the color correction is enhanced. But if the value of Qa is too large, the color correction may cause whiteout.

Similarly, instead of using the value Rip, it is also possible to cumulatively sum the frequencies of the classes in the gradation histogram Rh of the R component, proceeding from the minimum class toward the maximum class, and use the representative value Riq of the class at which the cumulative sum attains a given proportion (a prescribed fraction), such as Qi %, for example, of the number of pixels in the input image, as the gradation minimum value Ri.

When this is done, even if the signal Rin includes noise, the noise effects can be removed, and the essential minimum value of the color component can be obtained. The value of Qi % can be set in the range from 1% to 5%, for example. As the value of Qi increases, the slope of the color correction curve, described later, increases, so that the improvement effect of the color correction is enhanced. But if the value of Qi is too large, the color correction may cause blackout.

The maximum/minimum calculation unit 2 generates the maximum value Ga and the minimum value Gi of the G component and the maximum value Ba and the minimum value Bi of the B component in the same way as above. These values are output to the color correction curve generating unit 3.

On the basis of the maximum values Ra, Ga, and Ba and the minimum values Ri, Gi, and Bi input from the maximum/minimum calculation unit 2 for the respective color components, the color correction curve generating unit 3 generates the color correction curves by the following procedure.

First, the color correction curve generating unit 3 compares the maximum value Ra of the R component, the maximum value Ga of the G component, and the maximum value Ba of the B component that are input from the maximum/minimum calculation unit 2, and if one or more of these values are larger than the others, the color correction curve generating unit 3 calculates the largest value (the maximum of the maximum values Ra, Ga, Ba) as an all-color maximum value Ta, $$Ta=\mathrm{MAX}(Ra,Ga,Ba)$$

and generates the color correction curves referenced to the all-color maximum value Ta.

When the maximum value Ra of the R component, the maximum value Ga of the G component, and the maximum value Ba of the B component are all mutually equal, the color correction curve generating unit 3 compares the minimum value Ri of the R component, the minimum value Gi of the G component, and the minimum value Bi of the B component, and if one or more of these values are smaller than the others, the color correction curve generating unit 3 calculates the smallest value (the minimum of the minimum values Ri, Gi, and Bi), as an all-color minimum value Ti, $$Ti=\mathrm{MIN}(Ri,Gi,Bi)$$

and generates the color correction curves referenced to the all-color minimum value Ti.

First, the method of generating the color correction curves referenced to the all-color maximum value Ta will be described with reference to FIGS. 3(a) to 3(c) and FIGS. 4(a) and 4(b).

Figure 3A:
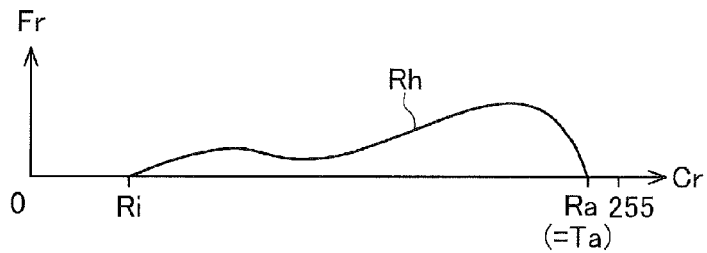
FIGS. 3(a) to 3(c) show exemplary gradation histograms of the R, G, and B components calculated by the gradation histogram unit in the first embodiment.
Figure 3B:
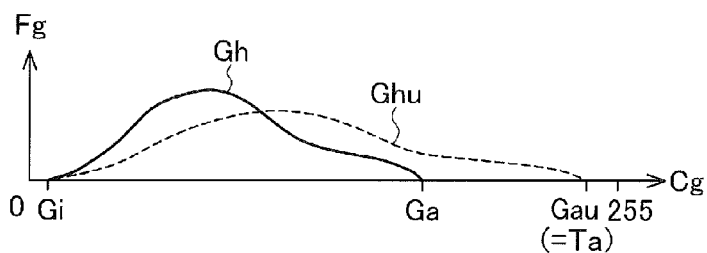
Figure 3C:
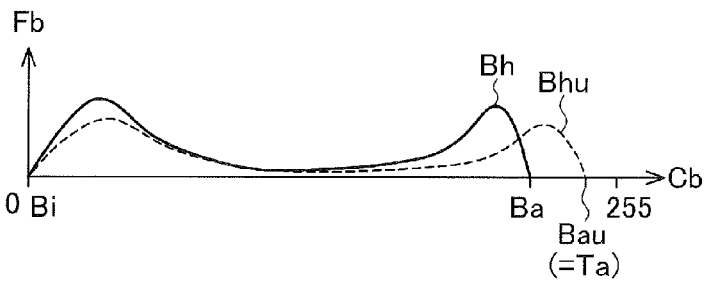

FIGS. 3(a) to 3(c) show how the gradation histograms are changed (reshaped) by the color correction curves to be generated, by showing the gradation histograms of the input image signals and the histograms of the output image signals. The gradation histograms for the output image signal are not actually generated, however; the histograms that would be obtained if they were generated are shown.

FIG. 3(a) shows the gradation histogram Rh of the R component calculated by the gradation histogram calculation unit 1 and the maximum value Ra and the minimum value Ri of the R component calculated by the maximum/minimum calculation unit 2.

FIG. 3(b) shows the gradation histogram Gh of the G component calculated by the gradation histogram calculation unit 1 and the maximum value Ga and the minimum value Gi of the G component calculated by the maximum/minimum calculation unit 2.

FIG. 3(c) shows the gradation histogram Bh of the B component calculated by the gradation histogram calculation unit 1 and the maximum value Ba and the minimum value Bi of the B component calculated by the maximum/minimum calculation unit 2.

For the combination shown in FIGS. 3(a) to 3(c), the color correction curve generating unit 3 calculates the all-color maximum value Ta (=Ra) from the R component maximum value Ra, the G component maximum value Ga, and the B component maximum value Ba.

For each of the color components other than the color component having the largest maximum value (the color component whose maximum value Xa (where X is R, G, or B) is equal to the all-color maximum value Ta), a color correction curve is generated such that the maximum value (the representative value of the maximum class) of the gradation histogram after the reshaping is equal to the all-color maximum value Ta.

Specifically, the gradation histogram Gh of the G component is reshaped so that its maximum value becomes equal to the all-color maximum value Ta (=Ra). The gradation histogram after the reshaping is denoted by reference characters Ghu, and its maximum value is denoted by reference characters Gau.

Similarly, the gradation histogram Bh of the B component is reshaped so that its maximum value becomes equal to the all-color maximum value Ta (=Ra). The gradation histogram after the reshaping is denoted by reference characters Bhu, and the maximum value is denoted by reference characters Bau.

Curves that carry out such reshaping of the histograms are generated as the color correction curves.

Figure 4A:
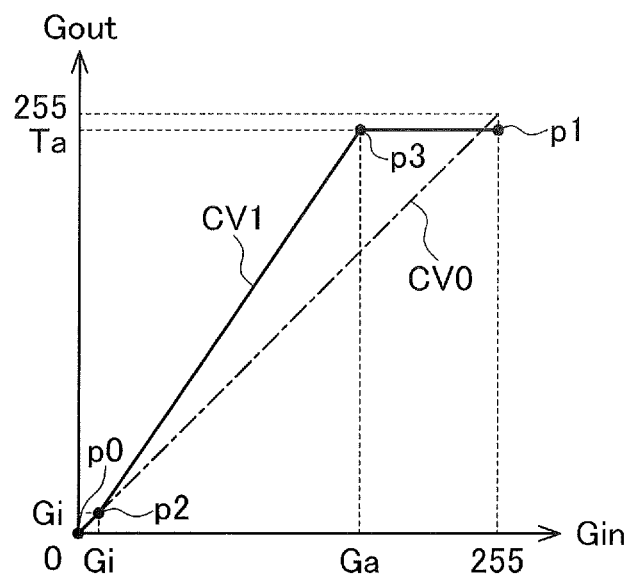
FIGS. 4(a) and 4(b) show different exemplary color correction curves generated by the color correction curve generating unit in the first embodiment.
Figure 4B:
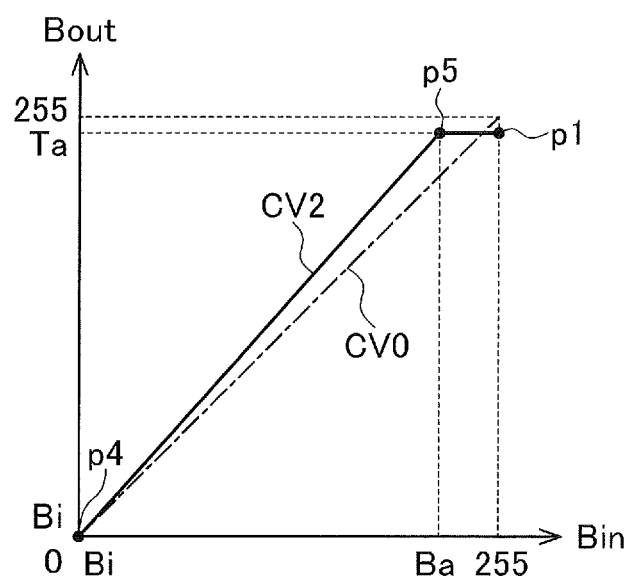

FIGS. 4(a) and 4(b) are examples of the color correction curves generated by the color correction curve generating unit 3. FIGS. 4(a) and 4(b) are the color correction curves for reshaping the gradation histograms as shown in FIGS. 3(a) to 3(c).

In FIG. 4(a), the horizontal axis represents the gradations of the G component Gin in the input image signal Din, and the vertical axis represents the gradations of the G component Gout in the output image signal Dout. In FIG. 4(b), the horizontal axis represents the gradations of the B component Bin in the input image signal Din, and the vertical axis represents the gradations of the B component Bout in the output image signal Dout.

Reference characters CV1 in FIG. 4(a) indicate the color correction curve for the G component, and reference characters CV2 in FIG. 4(b) indicate the color correction curve for the B component.

Reference characters Ta, Ga, Gi, Ba, and Bi in the drawings respectively indicate the all-color maximum value, the maximum value and the minimum value of the G component, and the maximum value and the minimum value of the B component, explained in connection with FIGS. 3(a) to 3(c). The lines denoted by CV0 in the drawings are lines with unity slope.

The color correction curve CV1 for the G component is generated by using the all-color maximum value Ta and the maximum value Ga and the minimum value Gi of the G component. That is, the color correction curve CV1 for the G component is a polyline connecting a point p0 at which the Gin gradation is 0 and the Gout gradation is 0, a point p2 at which the Gin gradation is Gi and the Gout gradation is Gi, a point p3 at which the Gin gradation is Ga and the Gout gradation is Ta (=Ra), and a point p1 at which the Gin gradation is 255 and the Gout gradation is Ta (=Ra).

The gradations of the G component Gout of the output image corresponding to the gradations of the G component Gin of the input image signal are values on this polyline CV1. The color correction curve CV1 for the G component is thus generated in such a way that the minimum value Gin of the G component and the minimum possible value of the G component do not change.

That is, the point on the color correction curve CV1 corresponding to the minimum value Gi of the G component Gin before the color correction is the point p2, and the minimum value Gi of the G component Gout after the color correction is equal to the minimum value Gi of the G component Gin before the color correction. Similarly, the point on the color correction curve CV1 corresponding to the minimum possible value (the value 0) of the G component Gin before the color correction is the point p0, and the minimum possible value (the value 0) of the G component Gout after the color correction is equal to the minimum possible value (the value 0) of the G component Gin before the color correction.

If the G component Gin has no value smaller than the minimum value Gi, how the color correction curve is determined in the range below the minimum value Gi has no real significance. But if the G component Gin has values smaller than the minimum value Gi, how the color correction curve is determined in the range below the minimum value Gi is significant. The G component Gin can have values smaller than the minimum value Gi when, for example, the representative value of the class at which the cumulative sum of the class frequencies attains a predetermined proportion is used as the minimum value Gi as described above.

Instead of generating the color correction curve CV1 such that neither the minimum value Gi of the G component nor the minimum possible value of the G component changes as described above, the color correction curve may be generated such that just one or the other of the minimum value Gi of the G component and the minimum possible value of the G component does not change.

The color correction curve CV2 for the B component is generated by using the all-color maximum value Ta and the maximum value Ba and the minimum value Bi of the B component. That is, the color correction curve CV2 for the B component is a polyline connecting a point p0 at which the Bin gradation is 0 and the Bout gradation is 0, a point p4 at which the Bin gradation is Bi and the Bout gradation is Bi, a point p5 at which the Bin gradation is Ba and the Bout gradation is Ta (=Ra), and a point p1 at which the Bin gradation is 255 and the Bout gradation is Ta (=Ra).

The gradations of the B component Bout of the output image signal corresponding to the gradations of the B component Bin of the input image signal are values on this polyline CV2. The color correction curve CV2 for the B component is thus generated in such a way that the minimum value Bi of the B component does not change.

The point p4 on the color correction curve CV2 in FIG. 4(b) is the point corresponding to the minimum possible value of the B component before the correction, so that it could also be said that the color correction curve CV2 in FIG. 4(b) is generated in such a way that the minimum possible value of the B component does not change.

Accordingly, it could also be said that the color correction curve CV2 for the B component is generated in such a way that the minimum value Bi of the B component and the minimum possible value of the B component do not change.

Instead of generating the color correction curve CV2 such that neither the minimum value Bi of the B component nor the minimum possible value of the B component changes as described above, the color correction curve may be generated such that just one or the other of the minimum value Bi of the B component and the minimum possible value of the B component does not change.

The reason why the color correction curve CV2 for the B component consists of a segment connecting the points p4 and p5 and a segment connecting the points p5 and p1 is that the value of Bi is 0 and the points p0 and p4 are the same point. When a plurality of points coincide (for example, when the value of Ba is 255, so that the points p5 and p1 are the same point), the number of points defining the color correction curve is three or less.

When one or more of the maximum values Ra, Ga, and Ba of the R, G, and B components are larger than the other maximum value(s), the color correction curve generating unit 3 generates a color correction curve in this way for each color component other than the color component(s) having the largest maximum value (the color component(s) whose maximum value Xa is equal to the all-color maximum value Ta). That is, if the maximum value Ra of the R component equals the all-color maximum value Ta, a color correction curve for the G component and a color correction curve for the B component are generated;

if the maximum value Ga of the G component equals the all-color maximum value Ta, a color correction curve for the B component and a color correction curve for the R component are generated;

if the maximum value Ba of the B component equals the all-color maximum value Ta, a color correction curve for the R component and a color correction curve for the G component are generated;

if the maximum value Ra of the R component and the maximum value Ga of the G component are equal and they are greater than the maximum value Ba of the B component, a color correction curve for the B component is generated;

if the maximum value Ra of the R component and the maximum value Ba of the B component are equal and they are greater than the maximum value Ga of the G component, a color correction curve for the G component is generated; and if the maximum value Ga of the G component and the maximum value Ba of the B component are equal and they are greater than the maximum value Ra of the R component, a color correction curve for the R component is generated.

The color correction curve generating unit 3 does not have to output a color correction curve for a color component (X) whose maximum value (Xa) is equal to the all-color maximum value Ta; the color correction unit 4 may output the unaltered input image signal as the output image signal (without carrying out a correction or gradation conversion). Alternatively, the color correction curve generating unit 3 may generate the lines CV0 with unity slope as shown in FIGS. 4(a) and 4(b), and the color correction unit 4 may use the lines CV0 with unity slope to carry out only formal corrections (in which no real correction is performed). If the lines with unity slope are used, the number of color correction curves is always the same, regardless of the sizes of the class maximum values for the respective color components.

When the maximum values Ra, Ga, and Ba of the R, G, and B components are all mutually equal, the color correction curves are generated on the basis of the all-color minimum value Ti.

How the color correction curves are generated on the basis of the all-color minimum value Ti will be described with reference to FIGS. 5(a) to 5(c) and FIGS. 6(a) and 6(b).

Figure 5A:
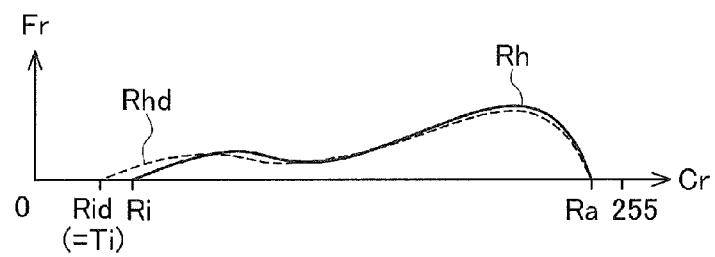
FIGS. 5(a) to 5(c) show exemplary gradation histograms of the R, G, and B components calculated by the gradation histogram unit in the first embodiment.
Figure 5B:
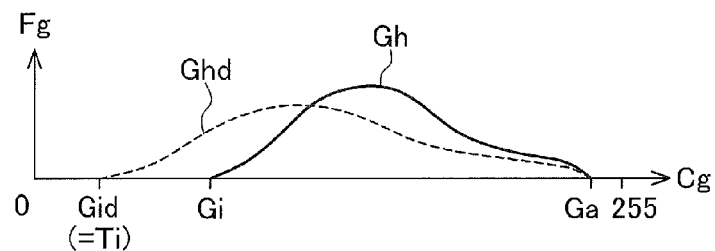
Figure 5C:
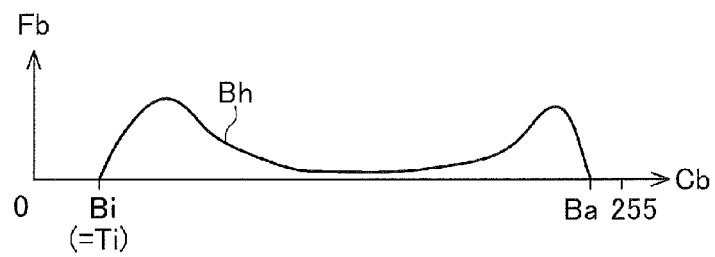

FIGS. 5(a) to 5(c) show how the gradation histograms are changed (reshaped) by the color correction curves to be generated, by showing the gradation histograms of the input image signals and the histograms of the output image signals. The gradation histograms for the output image signal are not actually generated, however; the histograms that would be obtained if they were generated are shown.

FIG. 5(a) shows the gradation histogram Rh of the R component calculated by the gradation histogram calculation unit 1 and the maximum value Ra and the minimum value Ri of the R component calculated by the maximum/minimum calculation unit 2.

FIG. 5(b) shows the gradation histogram Gh of the G component calculated by the gradation histogram calculation unit 1 and the maximum value Ga and the minimum value Gi of the G component calculated by the maximum/minimum calculation unit 2.

FIG. 5(c) shows the gradation histogram Bh of the B component calculated by the gradation histogram calculation unit 1 and the maximum value Ba and the minimum value Bi of the B component calculated by the maximum/minimum calculation unit 2.

In the combination shown in FIGS. 5(a) to 5(c), the maximum values Ra, Ga, and Ba are all the same, so that the color correction curve generating unit 3 calculates the all-color minimum value Ti (=Bi) from the minimum values Ri, Gi, and Bi.

For each of the color components other than the color component having the smallest minimum value (the color component whose minimum color value Xi (where X is R, G, or B) is equal to the all-color minimum value Ti), a color correction curve is generated such that the minimum value (the representative value of the minimum class) of the gradation histogram after the reshaping is equal to the all-color minimum value Ti.

Specifically, the gradation histogram Rh of the R component is reshaped so that its minimum value becomes equal to the all-color minimum value Ti (=Bi). The gradation histogram after the reshaping is denoted by reference characters Rhd, and its minimum value is denoted by reference characters Rid.

Similarly, the gradation histogram Gh of the G component is reshaped so that its minimum value becomes equal to the all-color minimum value Ti (=Bi). The gradation histogram after the reshaping is denoted by reference characters Ghd, and the minimum value is denoted by reference characters Gid.

Curves that carry out such reshaping of the histograms are generated as the color correction curves.

Figure 6A:
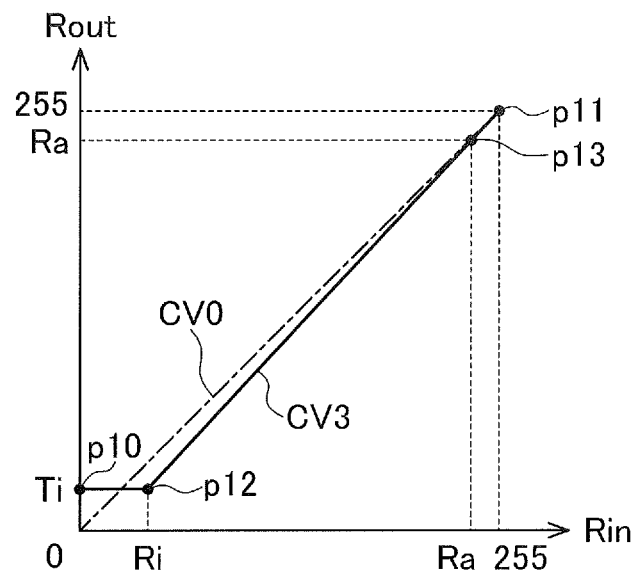
FIGS. 6(a) and 6(b) show different exemplary color correction curves generated by the color correction curve generating unit in the first embodiment.
Figure 6B:
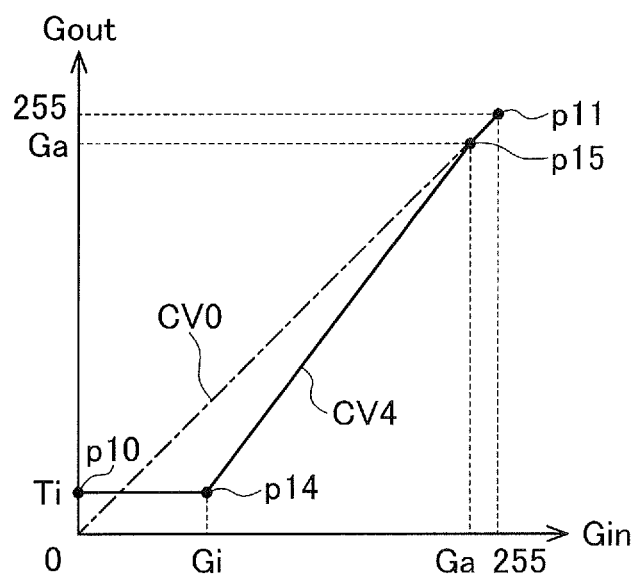

FIGS. 6(a) and 6(b) are examples of the color correction curves generated by the color correction curve generating unit 3. FIGS. 6(a) and 6(b) are the color correction curves for reshaping the gradation histograms as shown in FIGS. 5(a) to 5(c).

In FIG. 6(a), the horizontal axis represents the gradations of the R component Rin in the input image signal Din, and the vertical axis represents the gradations of the R component Rout in the output image signal Dout. In FIG. 6(b), the horizontal axis represents the gradations of the G component Gin in the input image signal Din, and the vertical axis represents the gradations of the G component Gout in the output image signal Dout.

Reference characters CV3 in FIG. 6(a) indicate the color correction curve for the R component, and reference characters CV4 in FIG. 6(b) indicate the color correction curve of the G component.

Reference characters Ta, Ra, Ri, Ga, and Gi in the drawings respectively indicate the all-color minimum value, the maximum value and the minimum value of the R component, and the maximum value and the minimum value of the G component, explained in connection with FIGS. 5(a) to 5(c). The lines denoted CV0 in the drawings are lines with unity slope.

The color correction curve CV3 of the R component is generated by using the all-color minimum value Ti and the maximum value Ra and the minimum value Ri of the R component. That is, the color correction curve CV3 for the R component is a polyline connecting a point p10 at which the Rin gradation is 0 and the Rout gradation is Ti (=Bi), a point p12 at which the Rin gradation is Ri and the Rout gradation is Ti (Bi), a point p13 at which the Rin gradation is Ra and the Rout gradation is Ra, and a point p11 at which the Rin gradation is 255 and the Rout gradation is 255.

The gradations of the R component Rout of the output image signal corresponding to the gradations of the R component Rin of the input image signal are values on this polyline CV3. The color correction curve CV3 for the R component is thus generated in such a way that the maximum value Ra of the R component and the maximum possible value of the R component do not change.

That is, the point on the color correction curve CV3 corresponding to the maximum value Ra of the R component Rin before the color correction is the point p13, and the maximum value Ra of the R component Rout after the color correction is equal to the maximum value Ra of the R component Rin before the color correction. Similarly, the point on the color correction curve CV3 corresponding to the maximum possible value (the value 255) of the R component Rin before the color correction is the point p11, and the maximum possible value (the value 255) of the R component Rout after the color correction is equal to the maximum possible value (the value 255) of the R component Rin before the color correction.

If the R component Rin has no value larger than the maximum value Ra, how the color correction curve is determined in the range above the maximum value Ra has no real significance. But if the R component Rin has values larger than the maximum value Ra, how the color correction curve is determined in the range above the maximum value Ra is significant. The R component Rin can have values larger than the maximum value Ra when, for example, the representative value of the class at which the cumulative sum of the class frequencies attains a predetermined proportion is used as the maximum value Ra as described above.

Instead of generating the color correction curve CV3 such that neither the maximum value Ra of the R component nor the minimum possible value of the R component changes, the color correction curve may be generated such that just one or the other of the maximum value Ra of the R component and the maximum possible value of the R component does not change.

The color correction curve CV4 for the G component is generated by using the all-color minimum value Ti and the maximum value Ga and the minimum value Gi of the G component. That is, the color correction curve CV4 for the G component is a polyline connecting a point p10 at which the Gin gradation is 0 and the Gout gradation is Ti (=Bi), a point p14 at which the Gin gradation is Gi and the Gout gradation is Ti (=Bi), a point p15 at which the Gin gradation is Ga and the Gout gradation is Ga, and a point p11 at which the Gin gradation is 255 and the Gout gradation is 255.

The gradations of the G component Gout of the output image signal corresponding to the gradations of the G component Gin of the input image signal are values on this polyline CV4. The color correction curve CV4 for the G component is thus generated in such a way that the maximum value Ga of the G component and the maximum possible value of the G component do not change.

That is, the point on the color correction curve CV4 corresponding to the maximum value Ga of the G component Gin before the color correction is the point p15, and the maximum value Ga of the G component Gout after the color correction is equal to the maximum value Ga of the G component Gin before the color correction. Similarly, the point on the color correction curve CV4 corresponding to the maximum possible value (the value 255) of the G component Gin before the color correction is the point p11, and the maximum possible value (the value 255) of the G component Gout after the color correction is equal to the maximum possible value (the value 255) of the G component Gin before the color correction.

If the G component Gin has no value larger than the maximum value Ga, how the color correction curve is determined in the range above the maximum value Ga has no real significance. But if the G component Gin has values larger than the maximum value Ga, how the color correction curve is determined in the range above the maximum value Ga is significant. The G component Gin can have values larger than the maximum value Ga when, for example, the representative value of the class at which the cumulative sum of the class frequencies attains a predetermined proportion is used as the maximum value Ga as described above.

Instead of generating the color correction curve CV4 such that neither the maximum value Ga of the G component nor the minimum possible value of the G component changes, the color correction curve may be generated such that just one or the other of the maximum value Ga of the G component and the maximum possible value of the G component does not change.

When one or more of the minimum values Ri, Gi, and Bi of the R, G, and B components are smaller than the other minimum value(s), the color correction curve generating unit 3 generates a color correction curve in this way for each color component other than the color component(s) having the smallest minimum value (the color component(s) whose minimum value Xi is equal to the all-color minimum value Ti). That is, if the minimum value Ri of the R component equals the all-color minimum value Ti, a color correction curve for the G component and a color correction curve for the B component are generated;

if the minimum value Gi of the G component equals the all-color minimum value Ti, a color correction curve for the B component and a color correction curve for the R component are generated;

if the minimum value Bi of the B component equals the all-color minimum value Ti, a color correction curve for the R component and a color correction curve for the G component are generated;

if the minimum value Ri of the R component and the minimum value Gi of the G component are equal and they are smaller than the minimum value Bi of the B component, a color correction curve for the B component is generated;

if the minimum value Ri of the R component and the minimum value Bi of the B component are equal and they are smaller than the minimum value Gi of the G component, a color correction curve for the G component is generated; and if the minimum value Gi of the G component and the minimum value Bi of the B component are equal and they are smaller than the minimum value Ri of the R component, a color correction curve for the R component is generated.

The color correction curve generating unit 3 does not have to output a color correction curve for a color component (X) whose minimum value (Xi) is equal to the all-color minimum value Ti; the color correction unit 4 may output the unaltered input image signal as the output image signal (without carrying out a correction). Alternatively, the color correction curve generating unit 3 may generate the lines CV0 with unity slope as shown in FIGS. 6(a) and 6(b) and the color correction unit 4 may use the lines CV0 with unity slope to carry out only formal corrections (in which no real correction is performed). If the lines with unity slope are used, the number of color correction curves is always the same, regardless of the sizes of the class minimum values for the respective color components.

The color correction curves CV (CV0 to CV4) generated in the color correction curve generating unit 3 in this way are input to the color correction unit 4. The color correction unit 4 converts or corrects the gradations of the input image signal Din (Rin, Gin, Bin) on the basis of the color correction curves corresponding to the respective color components input from the color correction curve generating unit 3, and outputs the converted image signal (output image signal) Dout (Rout, Gout, Bout). The color correction curves CV are supplied in the form of LUTs (lookup tables), for example, by referring to which the color correction unit 4 carries out the corrections.

Thus configured, the image processing apparatus in this embodiment has the effect that, if there are differences among the maximum values of the respective color components, the gradations of each color component can be corrected so that the maximum value of the color component becomes equal to the all-color maximum value Ta. As a result, the color closest to white (the gradations of all color components being 255, which is the maximum value of the dynamic range) becomes achromatic, with no color cast, in the image after the correction, and the difference between the maximum value and the minimum value of the color signal of the image after the correction can be widened, and contrast can be enhanced while color cast is corrected. Another effect is that the image can be brightened since the corrected image signal Dout has larger gradation values than the input image signal Din.

If the gradations of all color components are corrected to the maximum value of the dynamic range, in the case of an image with no white portions, forcible conversion to white is performed, causing such problems as the whitening of an image representing an evening sky. The image processing apparatus in this embodiment, however, performs corrections on the basis of the maximum values of the gradations of color components, so that the effect of eliminating such problems is obtained.

Another effect is that, for all pixels in an image, corrections are carried out such that the gradation values of the color components become greater than their original values, enabling colors to be changed correctly and color cast to be corrected. With conventional correction methods that allow there to be both pixels whose gradation values become greater and pixels whose gradation values become smaller, even though green and blue colors are increased in order to suppress a reddish look, for example, the correction also increases the reddishness, which is counterproductive.

In the above embodiment, the color correction curves are generated on the basis of the minimum values of the color components and the smallest value (all-color minimum value) Ti among the minimum values when there is no difference among the maximum values of the color components but there is a difference among the minimum values of the color components. But the color correction curves may be generated on the basis of the minimum values of the color components and the all-color minimum value Ti regardless of whether or not there is a difference among the maximum values of the color components, provided that there is a difference among the minimum values of the color components.

The correction of the gradations of the color components by generating the color correction curves on the basis of the minimum value of each color component and the all-color minimum value such that the minimum value of each color component becomes equal to the all-color minimum value Ti, changes the color closest to black (with the gradations of all color components being 0, which is the minimum value of the dynamic range) into an achromatic color without a color cast, in the image after the correction, and can widen the difference between the maximum value and the minimum value of the color signal of the image after the correction, obtaining the effect of enhanced contrast while correcting color cast. Another effect is that blacks can be reproduced, since the gradation values in the corrected image signal Dout become smaller than the gradation values in the input image signal Din. For example, when a picture is taken through glass, an image that seems to be permeated by a white mist is obtained, and black colors turn gray, but these colors can be made black.

When the frequencies in a gradation histogram are cumulatively summed from the maximum class toward the minimum class and the representative value of the class at which the cumulative sum attains a prescribed fraction of the total number of the pixels in one frame of the input image signal is set as the maximum value, even if the input image signal Din includes noise, the noise effects can be removed, and the essential maximum value of the gradation distribution can be used to generate the color correction curves, and accordingly, the color correction curves can be generated more properly.

Similarly, when the frequencies in a gradation histogram are cumulatively summed from the minimum class toward the maximum class and the representative value of the class at which the cumulative sum attains a prescribed fraction of the total number of pixels in the input image signal Din is set as the minimum value, even if the input image signal Din includes noise, the noise effects can be removed, and the essential minimum value of the gradation distribution can be used to generate the color correction curves, and accordingly, the color correction curves can be generated more properly.

Incidentally, although the color correction curve generating unit 3 generates a color correction curve for each color component other than the color component(s) having the largest maximum value (the color component(s) whose maximum value Xa equals the all-color maximum value Ta) such that the maximum value (Rau, Gau, or Bau) of the gradation histograms after the reshaping becomes equal to the all-color maximum value Ta, the maximum value (Rau, Gau, or Bau) of the gradation histograms after the reshaping need not be exactly equal to the all-color maximum value Ta; it need only be substantially equal to the all-color maximum value Ta. For example, color correction curves may be generated such that the maximum value becomes a value close to the all-color maximum value Ta, for example, a value in a range extending less than a prescribed value above and below the all-color maximum value Ta. The prescribed value need only be a value, such as 4 or 8, for example, that is adequately less than 256 gradations.

By correcting the gradations of each color component in this way, so that the maximum value of the color component becomes a value close to the all-color maximum value Ta, the color closest to white (with the gradations of all color components being 255, the maximum value of the dynamic range) can be changed to an achromatic color without color cast, in the image after the correction, contrast can be enhanced while color cast is corrected, and the values of the gradations in the corrected image signal Dout become greater than they were in the input image signal Din, so that the image can be brightened.

Although the color correction curve generating unit 3 generates a color correction curve for each color component other than the color component(s) having the largest maximum value (the color component(s) whose maximum value Xa equals the all-color maximum value Ta) such that the minimum value (Gi and Bi in the examples in FIGS. 4(a) and 4(b)) and/or the minimum possible value ('0' in the examples in FIGS. 4(a) and 4(b)) of the color component does not change, the minimum value and/or the minimum possible value of the color component does not have to be completely prevented from changing, and it is sufficient if the minimum value and/or the minimum possible value of the color component remains substantially unchanged; for example, changes with widths less than a prescribed value may be allowed. The prescribed value need only be a value, such as 4 or 8, for example, that is adequately less than 256 gradations.

Similarly, although the color correction curve generating unit 3 generates a color correction curve for each color component other than the color component(s) having the smallest minimum value (the color component(s) whose minimum value Xi equals the all-color minimum value Ti) such that the minimum value (Rid, Gid, or Bid) of the gradation histogram after the reshaping becomes equal to the all-color minimum value Ti, the minimum value (Rid, Gid, or Bid) of the gradation histogram after the reshaping need not be exactly equal to the all-color minimum value Ti; it need only be substantially equal to the all-color minimum value Ti. For example, color correction curves may be generated such the minimum value becomes a value close to the all-color minimum value Ti, for example, a value in a range extending less than a prescribed value above and below the all-color minimum value Ti. The prescribed value need only be a value, such as 4 or 8, for example, that is adequately less than 256 gradations.

By correcting the gradations of each color component so that the minimum value of each color becomes a value close to the all-color minimum value Ti, the color closest to black (with the gradations of all color components being 0, the minimum value of the dynamic range) can be changed to an achromatic color without color cast, in the image after the correction and contrast can be enhanced while color cast can be corrected.

Although the color correction curve generating unit 3 generates a color correction curve for each color component other than the color component(s) having the smallest minimum value (the color component(s) whose minimum value Xi equals the all-color minimum value Ti) such that the maximum value (Ra and Ga in the examples in FIGS. 6(a) and 6(b)) and/or the maximum possible value of the color component ('255' in the examples in FIGS. 6(a) and 6(b)) of the color component does not change, the maximum value and/or the maximum possible value of the color component does not have to be completely prevented from changing, and it is sufficient if the maximum value and/or the maximum possible value of the color component remains substantially unchanged; for example, changes with widths less than a prescribed value may be allowed. The prescribed value need only be a value, such as 4 or 8, for example, that is adequately less than 256 gradations.

This embodiment is described on the assumption that the color components are R, G, and B components. But this is not a limitation; the color components may be the C, M, Y, and K (cyan, magenta, yellow, and key plate) components used in printers etc. The embodiment is also applicable to a Lab color space (a type of color opponent space represented by lightness L and color opponent dimensions a and b). In short, the embodiment is applicable whenever the directions in which two or more of the colors R, G, B, C, M, and Y change in orthogonal directions.

In the above embodiment, the color correction unit 4 carries out the color corrections regardless of the sizes of the slopes of the input color correction curves. But when the color correction curves have large slopes, gradation skipping may occur in the color components of the corrected image signal Dout, degrading the image. Accordingly, when the color correction curve has a slope with a large value, greater than 2, for example, smoothing or another general type of noise correction may also be carried out after the color correction by the color correction curve, to reduce gradation skipping.

The color correction curve generating unit 3 may generate the color correction curves by using the class minimum values of the respective color components not only when the maximum values of the respective color components calculated by the maximum/minimum calculation unit 2 are mutually equal, but also when the differences among the maximum values of the respective color components are less than a prescribed value.

Instead of having the color correction curve generating unit 3 generate the color correction curves by using the class minimum values of the respective color components when the maximum values of the respective color components calculated by the maximum/minimum calculation unit 2 are mutually equal or when the differences among the maximum values of the respective color components are less than a prescribed value, an additional means may be provided to calculate the average luminance of the input image signal Din, and the average luminance output by this means may be used for deciding whether to use the class maximum values of the respective color components or the class minimum values of the respective color components for the generation of the color correction curves.

In one exemplary decision method, the class minimum values of the respective color components are used when the average luminance is equal to or more than a prescribed value, such as 128, the value in the center of the dynamic range, and the class maximum values of the color components are used when the average luminance is less than the prescribed value.

The color correction curves that use the class minimum values of the color components make the image after the correction darker than the input image, but have the effect that blacks can be reproduced. The color correction curves that use the class maximum values of the color components have the effect of making the image after the correction brighter than the input image.

This decision method gives priority to the reproduction of blacks when the input image is bright; it gives priority to brightening the image when the input image is dark.

Second Embodiment

Figure 7:
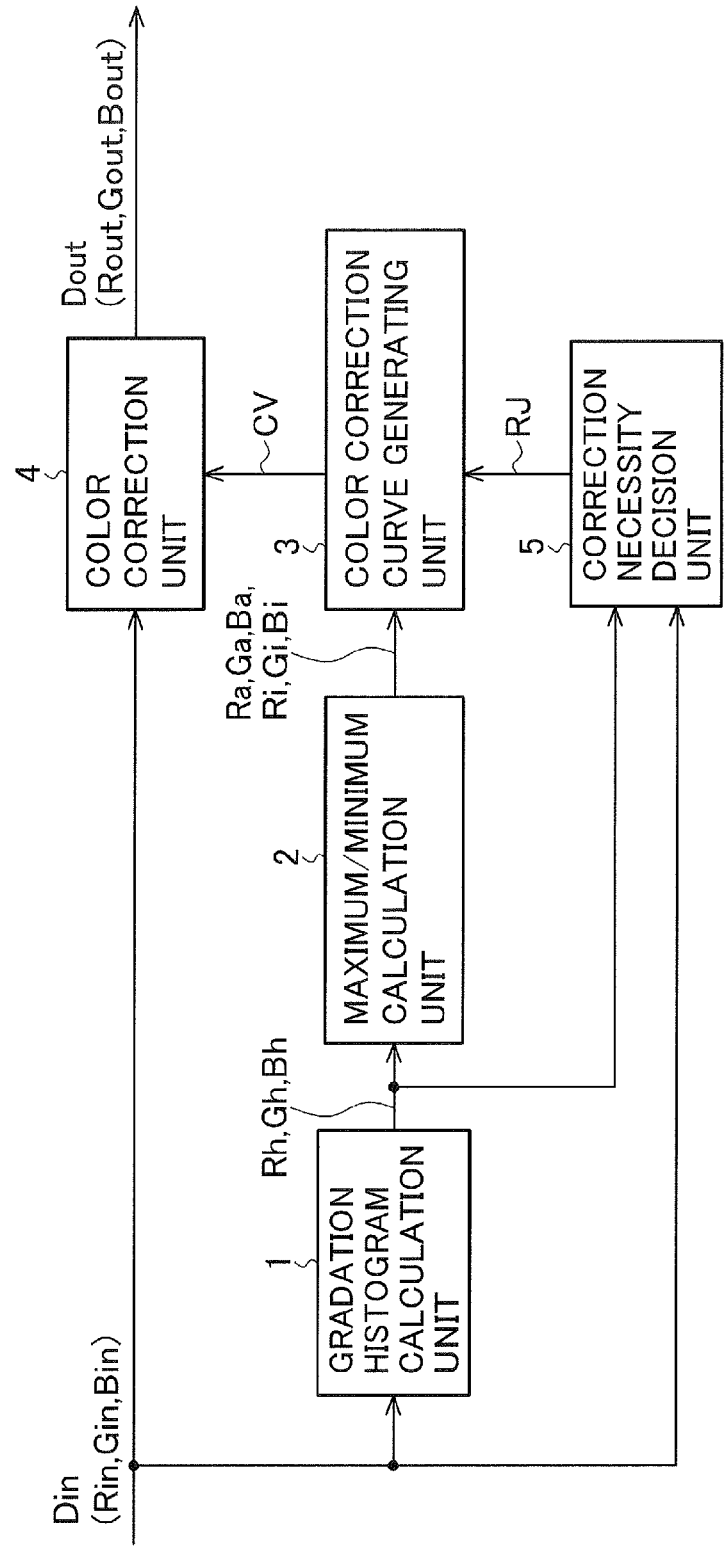
FIG. 7 is a block diagram of an image processing apparatus according to a second embodiment of the invention.

FIG. 7 shows the structure of an image processing apparatus according to a second embodiment of the invention. The illustrated image processing apparatus includes a gradation histogram calculation unit 1, a maximum/minimum calculation unit 2, a color correction curve generating unit 3, a color correction unit 4, and a correction necessity decision unit 5.

The gradation histogram calculation unit 1, the maximum/minimum calculation unit 2, the color correction curve generating unit 3, and the color correction unit 4 in FIG. 7 are similar to those described in the first embodiment.

The input image signal Din is input not only to the gradation histogram calculation unit 1 and the color correction unit 4 but also to the correction necessity decision unit 5.

The gradation histograms of the respective color components, namely the gradation histograms Rh, Gh, and Bh of the R, G, and B components, calculated by the gradation histogram calculation unit 1, are output not only to the maximum/minimum calculation unit 2 but also to the correction necessity decision unit 5.

Using the gradation histograms Rh, Gh, and Bh of the respective color components, input from the gradation histogram calculation unit 1, the correction necessity decision unit 5 decides whether or not the area of image regions consisting of pixels whose gradation values belong to the same class is large, and also calculates hue values from the signals Rin, Gin, and Bin constituting the input image signal Din and representing the color components, calculates the hue distribution (hue histogram) in one frame of the image, and determines whether or not the hue distribution is greatly skewed.

The color correction curve generating unit 3 generates the color correction curves not only on the basis of the maximum and minimum values of the respective color components input from the maximum/minimum calculation unit 2, but also on the basis of the decision result input from the correction necessity decision unit 5, and outputs the color correction curves to the color correction unit 4.

The correction necessity decision unit 5 will now be described in more detail.

Figure 8:
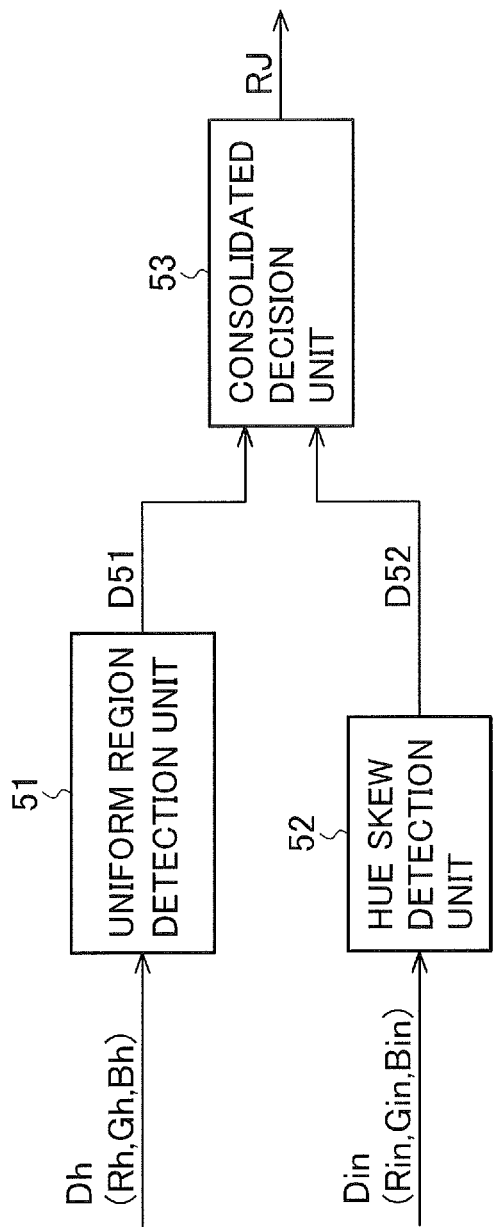
FIG. 8 is a block diagram showing an example of the correction necessity decision unit in FIG. 7.

As shown in FIG. 8, the correction necessity decision unit 5 includes a uniform region detection unit 51, a hue skew detection unit 52, and a consolidated decision unit 53.

The uniform region detection unit 51 uses the gradation histograms Rh, Gh, and Bh of the respective color components, input from the gradation histogram calculation unit 1 to determine (infer), for each color component, whether or not the fraction of the image area made up of regions consisting of pixels whose gradation values belong to the same class is larger than a prescribed value (a predetermined value). This determination is carried out on the basis of whether or not the absolute differences between the frequencies of mutually adjacent classes in the gradation histograms exceed the prescribed threshold values (predetermined values).

The hue skew detection unit 52 analyzes the hue distribution of the input image signal Din by using the input image signal Din and determines (infers) whether or not the hue distribution is greatly skewed. This determination is carried out on the basis of whether or not a missing hue range having at least a prescribed width is present.

On the basis of the result of the determination made by the uniform region detection unit 51 and the result of the determination made by the hue skew detection unit 52, the consolidated decision unit 53 decides whether the correction is necessary.

The operation of the uniform region detection unit 51 will be described in detail below.

As shown in FIG. 9, the uniform region detection unit 51 includes absolute difference calculation units 511$r$, 511$g$, 511$b$, absolute difference comparison units 512$r$, 512$g$, 512$b$, and a decision unit 513.

The absolute difference calculation units 511$r$, 511$g$, 511$b$ calculate the absolute differences between the frequencies of mutually adjacent classes (the absolute difference between the frequency of a class and the frequency of its upper adjacent class, which is the class with a class value larger by 1) for the gradation histograms Rh, Gh, and Bh of the R, G, and B components input from the gradation histogram calculation unit 1, respectively.

This means that the absolute difference calculation unit 511$r$ for the R component calculates the absolute differences between the frequencies Fr of adjacent classes in the gradation histogram Rh of the R component, thereby calculating absolute differences ADr.

Figure 10A:
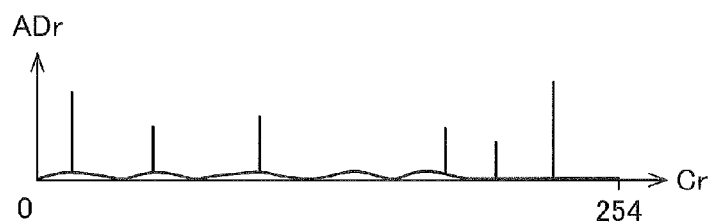
FIGS. 10(a) and 10(b) show different examples of the absolute differences in frequency between each class and the upwardly adjacent class found by the R-component absolute difference calculation unit in FIG. 8.
Figure 10B:

FIGS. 10($a$) and 10($b$) show the absolute differences ADr between the frequencies Fr of adjacent classes. The horizontal axis represents the classes Cr (=0 to 254) other than the maximum class; the vertical axis represents the absolute differences ADr between the corresponding classes and their upper adjacent classes. That is, the relationship between the class values Cr on the horizontal axis and the absolute differences ADr on the vertical axis in FIGS. 10($a$) and 10($b$) is expressed by the following equation.

$$ADr=|Fr(Cr+1)-Fr(Cr)|$$

In the above equation, Fr(Cr) indicates the frequency of the class Cr.

The number of the calculated absolute differences ADr between classes is one less than the number of the classes Cr in the gradation histogram. The total sum of the absolute differences ADr is equal to or less than twice the total sum of the frequencies Fr (the total frequency of occurrence of the gradation values) in the entire gradation histogram.

FIG. 10($a$) shows an example of the absolute differences in an image in which uniform color regions occupy a large area, and FIG. 10($b$) shows an example of the absolute differences in an image in which uniform color regions occupy a small area. Here, a uniform color region means an image region consisting of pixels having gradation values belonging to the same class in each color component.

As shown in FIG. 10($a$) and FIG. 10($b$), a feature of an image in which uniform color regions occupy a large area is that the maximum value of the absolute differences is much greater than the maximum value of the absolute differences in an image in which uniform color regions occupy a small area. Images in which uniform color regions occupy a large area include images, such as animated cartoons and logo marks, that are composed only of uniform color regions. In these images, there are more gradations at which the absolute difference is 0 than there are in images in which uniform color regions occupy a small area, so that another feature of images in which uniform color regions occupy a large area is that, in comparison with images in which uniform color regions occupy a small area, they have fewer colors.

Operating similarly to the absolute difference calculation unit 511$r$ for the R component, the absolute difference calculation unit 511$g$ for the G component and the absolute difference calculation unit 511$b$ for the B component calculate absolute differences ADg and ADb between the frequencies of adjacent classes in the gradation histogram Gh of the G component and the gradation histogram Bh of the B component.

On the basis of the thus generated absolute differences between the frequencies of adjacent classes in the gradation histograms of the R, G, and B color components, whether or not the input image is an image in which uniform color regions occupy a large area is decided as follows.

For example, threshold values ADrth, ADgth, and ADbth for the absolute differences in the gradation histograms are set to 20% of the total number of pixels in the input image.

The absolute difference comparison unit 512$r$ compares the absolute differences ADr between adjacent classes in the gradation histogram Rh of the R component with the threshold value ADrth, determines whether or not there is an absolute difference exceeding the threshold value, and outputs a determination result EXr.

Similarly, the absolute difference comparison unit 512$g$ compares the absolute differences ADg between adjacent classes in the gradation histogram Gh of the G component with the threshold value ADgth, determines whether or not there is an absolute difference exceeding the threshold value, and outputs a determination result EXg.

Similarly, the absolute difference comparison unit 512$b$ compares the absolute differences ADb between adjacent classes in the gradation histogram Bh of the B component with the threshold value ADbth, determines whether or not there is an absolute difference exceeding the threshold value, and outputs a determination result EXb.

If any one of the absolute difference comparison units 512$r$, 512$g$, 512$b$ shows a comparison result indicating that 'there is an absolute difference exceeding the threshold value', the decision unit 513 outputs a decision result indicating that the input image includes a uniform region of large area.

When this decision result is output, the correction necessity decision unit 5 decides that the color correction is 'unnecessary'.

Conversely, if none of the absolute difference comparison units 512*r*, 512*g*, 512*b* show a comparison result indicating that 'there is an absolute difference value exceeding the threshold value', the decision unit 513 outputs a decision result indicating that the input image does not include uniform color regions of large area.

The reason why the necessity of the color correction is decided on the basis of the result of the determination as to whether or not the input image is an image in which uniform color regions occupy a large area will now be explained. The types of input images include images (natural images) of landscapes and people captured as subjects by digital cameras or other types of electronic devices, and images whose colors and shapes are designed by hand, such as paintings, CGs, illustrations, etc. A problem with the latter type is that the images are drawn with color brightnesses intended by the creator, so that if the colors or the brightness is changed by a color correction or the like, the resulting image will contradict the creator's intentions. Another problem is that when an object drawn in the image includes one of people's memory colors, the changed image contradicts the memory color.

Further problems that might arise are that a color correction can make an illustration drawn with a pencil-like touch look like an illustration drawn with a ballpoint pen, make a watercolor painting look like an oil painting, change a picture of a gray animal into a picture of a white animal, and so on.

Therefore, when a color correction is carried out by correcting the gradations, it is necessary to determine whether or not the image is an image that might be harmed by the color correction. A common feature of images that can be harmed by a color correction is the presence of solid color regions (areas filled with a single color). Accordingly, in this embodiment, whether or not the image includes solid color regions, that is, whether or not the image is an image in which uniform color regions occupy a large area, is determined and if the image is an image in which uniform color regions occupy a large area, a decision not to carry out the color correction is made.

When whether or not the image is an image in which uniform regions occupy a large area is determined on the basis of differences between the frequencies of adjacent classes in the gradation histograms as described above, however, it is necessary to bear in mind that even in a natural image, sometimes the maximum class and the minimum class in the gradation histograms have large frequencies and accordingly the absolute differences between the maximum class and its adjacent class and between the minimum class and its adjacent class become extremely large.

Figure 11A:
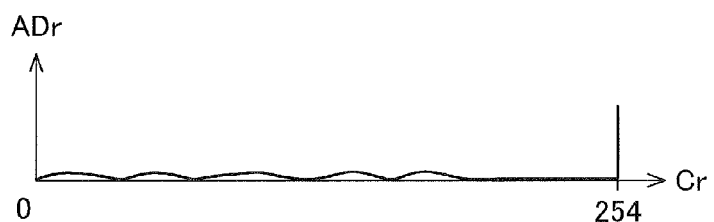
FIGS. 11(a) to 11(c) show examples of the absolute values of the differences in frequency between each class and the upwardly adjacent class found by the absolute difference calculation units for the R component, the G component, and the B component in FIG. 8.
Figure 11B:
Figure 11C:
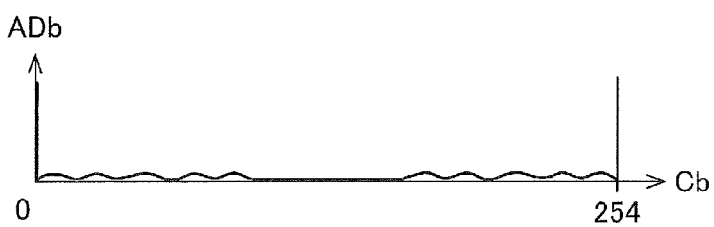

FIGS. 11(*a*) to 11(*c*) show the absolute differences between the frequencies of adjacent classes in the gradation histograms Rh, Gh, and Bh of the R component, the G component, and the B component, respectively, for an image such as a landscape image in which the area occupied by uniform color regions is small.

In the example in FIG. 11(*a*), the absolute difference between the maximum class and its adjacent class is extremely large; in the example in FIG. 11(*c*), the absolute difference between the minimum class and its adjacent class and the absolute difference between the maximum class and its adjacent class are both extremely large. This problem of extremely large absolute differences between the maximum class and its adjacent class and between the minimum class and its adjacent class occurs in the red and blue components.

The reason for this is as follows. The human eye is more sensitive to brightness than to color differences, so that imaging devices are often set up so as to capture images with luminance distributions approaching the maximum and minimum values of the dynamic range. The ratios of the luminance contributions of the R, G, and B components are 30 percent for the red component, 60 percent for the green component, and 10 percent for the blue component, so that the gradation histogram of the green component seldom has a distribution skewed toward the maximum or minimum class, but the gradation histograms of the red and blue components sometimes have distributions skewed toward the maximum or minimum class, and consequently, the absolute difference between the maximum class and its adjacent class or between the minimum class and its adjacent class sometimes becomes extremely large.

Therefore, the determination as to whether or not the absolute differences between adjacent classes exceed a threshold value may be carried out in a range excluding the maximum and minimum classes.

In this case, the determination of whether the absolute differences between adjacent classes exceed the threshold value may be carried out in the range excluding the maximum class and the minimum class only for the R component and the B component; the determination of whether the absolute differences between adjacent classes exceed the threshold value may be carried out for the G component without excluding the maximum class and the minimum class.

The correction necessity decision unit 5 may also determine whether or not the difference values between adjacent classes exceed the threshold value by using the gradation histogram of the G component alone, without using the R component and the B component. This is because the occurrence of extremely large absolute differences in the gradation histograms, even in the case of an image in which the area of uniform color regions is small, arises in the absolute differences in the gradation histograms of the R component and the B component, and not in the absolute differences in the gradation histogram of the G component, which is close to the luminance component.

By using only the gradation histogram of the G component (omitting the generation of gradation histograms of other color components) it is possible to eliminate computations such as the calculation of absolute differences and comparison with threshold values that are required when the gradation histograms of other color components are used, and also determine correctly whether or not the input image is an image in which uniform color regions occupy a large area.

Accordingly, the amount of computation required to analyze the other color components can be eliminated, and whether or not the image is one for which a color correction is undesirable, such as an animated cartoon or a CG, can be properly determined.

Next, the operation of the hue skew detection unit 52 will be described in detail.

Figure 12:
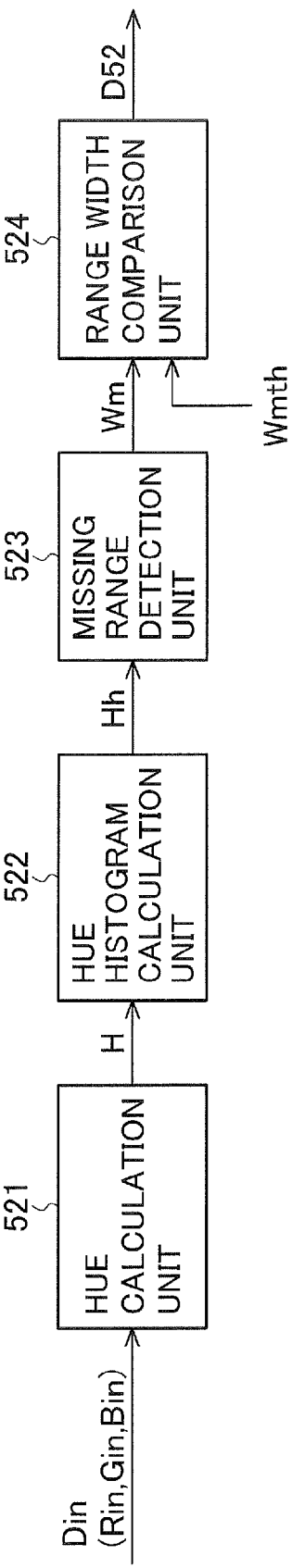
FIG. 12 is a block diagram showing an example of the hue skew detection unit in FIG. 8.
Figure 13A:
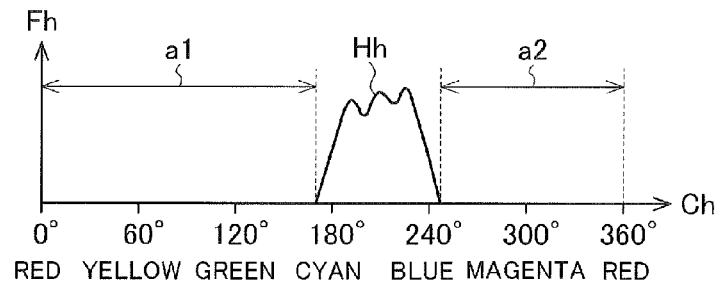
FIGS. 13(a) to 13(d) are diagrams showing different exemplary hue histograms calculated by the hue histogram calculation unit in FIG. 12.
Figure 13B:
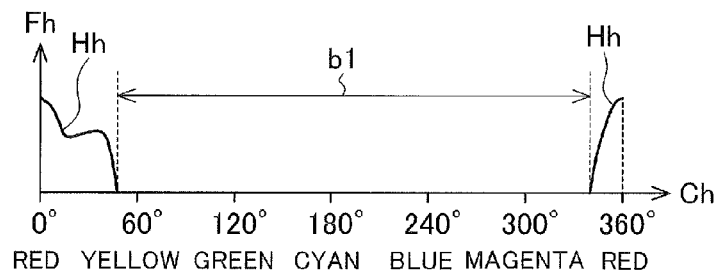
Figure 13C:
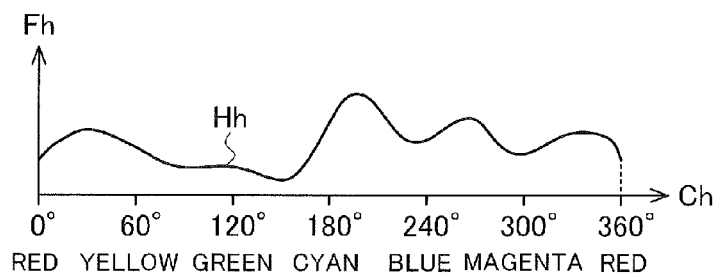
Figure 13D:
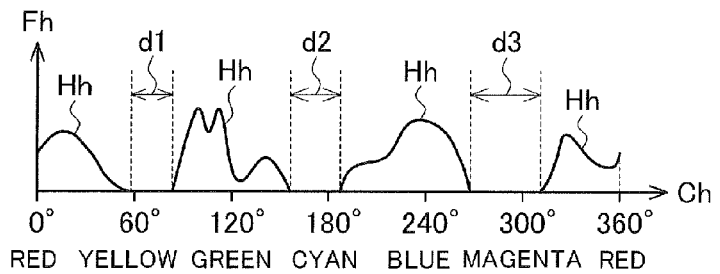

As shown in FIG. 12, the hue skew detection unit 52 includes a hue calculation unit 521, a hue histogram calculation unit 522, a missing range detection unit 523, and a range width comparison unit 524.

The hue calculation unit 521 calculates the hue value (hue angle) of each pixel on the basis of the values of the color components of the image signal Din input to the hue skew detection unit 52. This calculation can be carried out by using, for example, the following formulas (1A) to (1C), which are generally used for RGB to HSV conversion.

That is, if the greatest (the greatest value for each pixel) among the R, G, and B gradation values (0 to 255) of each pixel is denoted by MAX and the smallest (the smallest value for each pixel) is denoted by MIN, hues H (0 to 360) are obtained from formulas (1A) to (1C). If MAX=MIN, the color is determined to be achromatic, with no hue.

[Mathematical expression 1]

$$H = 60 \times \frac{G-B}{MAX-MIN} + 0 \text{ (when MAX = R)} \quad (1A)$$

$$H = 60 \times \frac{B-R}{MAX-MIN} + 120 \text{ (when MAX = G)} \quad (1B)$$

$$H = 60 \times \frac{R-G}{MAX-MIN} + 240 \text{ (when MAX = B)} \quad (1C)$$

If formula (1A) gives a value less than 0 for H, then 360 is added to that value to obtain the value of H. When the hue values H calculated by formulas (1A) to (1C) include fraction digits, they may be rounded off to the nearest integer, or another rounding process may be carried out.

Using the hue values calculated by the hue calculation unit 521, the hue histogram calculation unit 522 generates a hue histogram of one frame of the image signal.

Each class in the hue histogram may consist either of a single hue value or of two or more consecutive hue values. When each class in the hue histogram consists of a single hue value, the hue value is the representative value (class value) of the class. When each class in the hue histogram consists of a plurality of consecutive hue values, the mean or median of the hue values included in each class may be set as the representative value of the class.

FIGS. 13(*a*) to 13(*d*) show different examples of hue histograms (hue distributions) calculated for four different input image signals Din by the hue histogram calculation unit 522. In FIGS. 13(*a*) to 13(*d*), the horizontal axis represents the class Ch and the vertical axis represents the frequency Fh (the number or proportion of pixels having the hue values belonging to the class).

FIG. 13(*a*) shows the hue distribution of an image including sky, sea, and so on, with much blue overall; FIG. 13(*b*) shows the hue distribution of an image of a sunset or the like with much red overall; FIG. 13(*c*) shows the hue distribution of a brightly colored image having all hue components; FIG. 13(*d*) shows the hue distribution of a general sort of image with several missing hue portions.

On the basis of the hue distribution calculated by the hue histogram calculation unit 522 for one frame of the image signal, the missing range detection unit 523 detects a range of absent hues, that is, a range (missing hue range) consisting of a plurality of consecutive classes in which the number of pixels having the relevant hues is equal to or less than a prescribed threshold value.

The 'prescribed threshold value' here is set at, for example, a prescribed fraction of the mean value of the number of pixels per class (the value obtained by dividing the total number of pixels by the number of the classes): for example, a value corresponding to 1%.

For example, a range a1 and a range a2 in FIG. 13(*a*), a range b1 in FIG. 13(*b*), and a range d1, a range d2, and a range d3 in FIG. 13(*d*) are detected as missing hue ranges. In FIG. 13(*c*) there is no missing hue range.

Next, the missing range detection unit 523 determines the widths of the detected missing hue ranges and also determines the largest Wm of the widths of the ranges (the largest missing range width).

First, when both a range with a minimum value of 0 degrees, such as the range a1 in FIG. 13(*a*), and a range with a maximum value of 360 degrees, such as the range a2 in FIG. 13(*a*) are included, the two ranges are concatenated and treated as a single missing range. Specifically, the combination of the range a1 and the range a2 is treated as a single missing hue range.

The width of a missing hue range can be obtained by taking the difference between the representative value of its maximum class and the representative value of its minimum class. More precisely, the value obtained by adding the width of one class (the number of gradations included in one class) to this difference is the width of the missing hue range. For a missing hue range obtained by concatenating a range extending upward from 0 degrees and a range extending downward from 360 degrees as in FIG. 13(*a*), 360 must be added to the representative values of the classes upward of 0 degrees before calculating the difference.

When there is only one missing hue range, as in FIGS. 13(*a*) and 13(*b*), this missing range is treated as the largest missing range in the image signal.

When there are a plurality of missing hue ranges, as in FIG. 13(*d*), the largest range is treated as the largest missing range in the image signal.

In this manner, the missing range detection unit 523 obtains (a1+a2), b1, and d3, respectively, as the widths of the largest missing ranges in the three hue histograms shown in FIGS. 13(*a*), 13(*b*), and 13(*d*).

The range width comparison unit 524 compares the largest missing range width Wm calculated by the missing range detection unit 523 with a prescribed threshold value Wmth, determines whether or not the largest missing range width is greater than the threshold value, and outputs the result of this determination.

The threshold value is, for example, a value corresponding to 240 degrees.

If the missing range width is determined to be greater than the threshold value, the color correction is decided to be unnecessary.

The reason why the necessity of the color correction is determined on the basis of missing range widths is as follows.

That is, when the largest missing range is narrow (the largest missing range width is equal to or less than the threshold value of, for example, 240 degrees), there is a strong possibility that many hues are included in the image signal, and a color cast is present due to the color rendering properties of the lighting or the like, so that the color correction is decided to be 'necessary'.

Conversely, when the largest missing range is wide (when the largest missing range width is equal to or greater than a prescribed value), there is a strong possibility that the hues are skewed, the fewer hues are included in the image signal, and the image is a close-up image of a subject, an image of sky or seascape gradations, or an image of sunset gradations. Correcting the colors in images of these types would cause problematic changes in color, such as changing some of the sunset colors to yellow or magenta. Therefore, in this case, the color correction is decided to be 'unnecessary'.

The consolidated decision unit 53 decides whether the color correction is necessary on the basis of the result of the determination made by the uniform region detection unit 51 and the result of the determination made the hue skew detection unit 52.

That is, if either or both of the determination result made by the uniform region detection unit 51 indicating that a uniform region is present, and the determination result made by the hue skew detection unit 52 indicating that the hue skew is present is output, the consolidated decision unit 53 makes a decision (a final decision) that the correction is unnecessary;

conversely, if neither of the determination result made by the uniform region detection unit 51 indicating that a uniform region is present, and the determination result made by the hue skew detection unit 52 indicating that the hue skew is present is output, the consolidated decision unit 53 makes a decision (a final decision) that the correction is necessary.

The result of the final decision made by the consolidated decision unit 53 is output to the color correction curve generating unit 3 as the decision result RJ of the correction necessity decision unit 5.

The color correction curve generating unit 3 generates the color correction curves on the basis of the maximum and minimum values input from the maximum/minimum calculation unit 2 for each color component and the decision result on the necessity of the correction input from the correction necessity decision unit 5.

If the decision result input from the correction necessity decision unit 5 indicates that the correction is 'necessary', the color correction curve generating unit 3 generates the color correction curves by using the maximum and minimum values of the respective color components, input from the maximum/minimum calculation unit 2, and following the same procedure as in the first embodiment, and the color correction unit 4 uses the color correction curves generated by the color correction curve generating unit 3 to carry out the corrections on the input image Din.

Conversely, if the decision result input from the correction necessity decision unit 5 indicates that the correction is 'unnecessary', the color correction curve generating unit 3 may refrain from outputting the color correction curves and the color correction unit 4 may output the unaltered input image signal as the output image signal (without carrying out a correction or gradation conversion). Alternatively, the color correction curve generating unit 3 may generate the lines CV0 with unity slope as the color correction curves and the color correction unit 4 may use the lines CV0 with unity slope to carry out only formal corrections (in which no real correction is performed). If lines with unity slope are used, the number of color correction curves is always the same, regardless of the sizes of the class maximum values of the color components.

Being structured as described above, the image processing apparatus according to this embodiment uses gradation histograms and a hue histogram to decide whether or not the image should be corrected, permitting a control scheme such that the corrections are carried out only on images in which the corrections are effective and not on images in which problems would arise if the corrections were made.

In particular, in the example described above, the absolute differences between the frequencies of adjacent classes are calculated by using the gradation histograms, and whether or not there is an image region which consists of pixels having gradation values belonging to the same class and which is present in a proportion equal to or greater than a prescribed proportion is determined on the basis of whether or not there is a class whose absolute difference exceeds a prescribed threshold value, and if it is determined that there is an image region which consists of pixels having gradation values belonging to the same class and which is present in a proportion equal to or greater than a prescribed proportion, it is decided not to correct the input image signal. Therefore, whether or not the input image is a type of image, such as an animated cartoon or a CG, for which a correction would be undesirable can be accurately determined.

Since whether or not to carry out the color correction is also decided from the skew of the hue component of the image signal (the existence of a wide missing hue range), on the basis of the hue histogram, whether or not a color cast is present can be accurately determined, so that the correction can be controlled to be carried out only on images having a color cast, and not on images for which a correction would be undesirable.

In the above example, the uniform region detection unit 51 in the correction necessity decision unit 5 compares the absolute differences between adjacent classes in the gradation histograms with prescribed threshold values, and determines that the input image is an image in which a uniform color region occupies a large area if a class with a value exceeding the prescribed threshold value is present. However, the uniform region detection unit 51 may determine that the correction should not be made and that the input image is an image in which uniform color regions occupy a large area, when, for each of at least a prescribed number of classes, the absolute difference between the class and its adjacent class exceeds a prescribed threshold value (a threshold value for absolute differences), in other words, when at least a prescribed number of absolute differences between the frequencies of mutually adjacent classes in the gradation histograms exceed the prescribed threshold value. In this case, the 'prescribed number' is set at 5, for example, and the prescribed threshold value is set at 10%.

Figure 14:
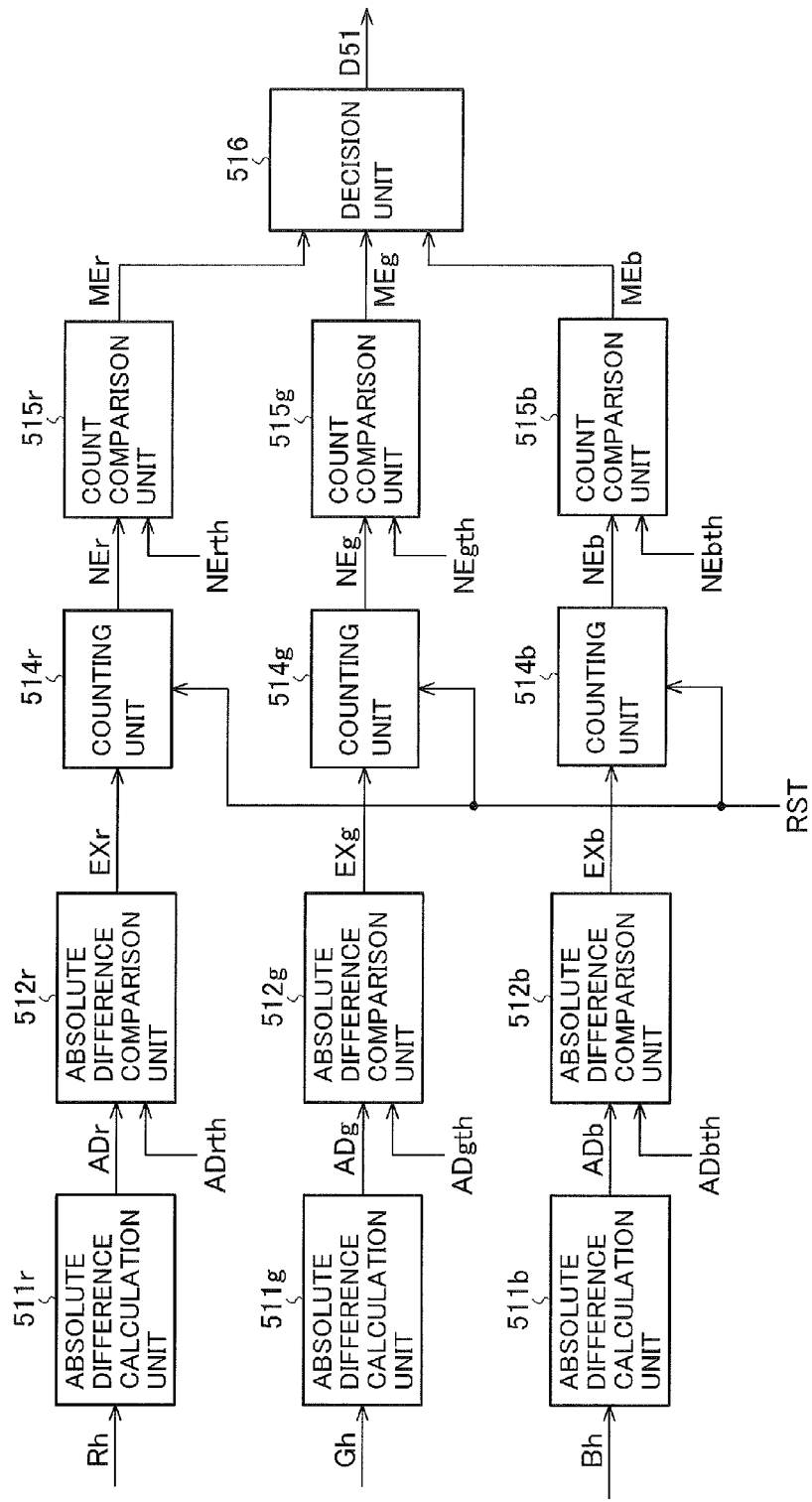
FIG. 14 is a block diagram showing another example of the uniform region detection unit in FIG. 8.

In this case, the uniform region detection unit 51 is configured as shown in FIG. 14.

The absolute difference calculation units 511*r*, 511*g*, 511*b*, and the absolute difference comparison units 512*r*, 512*g*, 512*b* are similar to the ones shown in FIG. 9; the absolute difference comparison units 512*r*, 512*g*, 512*b* compare the absolute differences between the classes and their upper adjacent classes calculated by the corresponding absolute difference calculation units 511*r*, 511*g*, 511*b* with threshold values ADrth, ADgth, ADbth (values corresponding to 10%), respectively, and if the absolute differences exceed the corresponding threshold values, they output signals indicating this.

The counting units 514*r*, 514*g*, 514*b* have their count values NEr, NEg, NEb reset to zero by a reset signal RST at a start of the absolute difference calculation process for one frame of the input image signal, and increment the count values NEr, NEg, NEb by 1 whenever the comparison results obtained by the absolute difference comparison units 512*r*, 512*g*, 512*b* indicate that the relevant absolute difference value exceeds the relevant threshold value.

The count comparison units 515*r*, 515*g*, 515*b* compare the count values NEr, NEg, NEb of the corresponding counting units 514*r*, 514*g*, 514*b* with the above prescribed numbers (threshold values) NErth, NEgth, NEbth (e.g., '5') and, when the count values reach the threshold values, output signals MEr, MEg, MEb indicating this fact.

Therefore, if the count values reach the corresponding threshold values by the time the comparison of the absolute differences with the threshold values ends for all the classes, the count comparison units 515r, 515g, 515b output signals MEr, MEg, MEb indicating this fact.

When the signal MEr, MEg, or MEb indicating that the count value has reached the corresponding threshold value is output from any of the count comparison units 515r, 515g, 515b, the decision unit 516 outputs a decision result indicating that the image is an image in which uniform color regions occupy a large area.

Making the decision in this way enables the decision to be made more accurately by utilizing the feature of illustrations and other drawn images that they have few colors.

The structure in FIG. 14 becomes identical to the structure in FIG. 9 if the threshold values NErth, NEgth, NEbth used in the count comparison units 515r, 515g, 515b are '1'. Accordingly, the structure in FIG. 9 can be considered as one aspect of the structure in FIG. 14.

In the structure in FIG. 7, the color correction curve generating unit 3 outputs the color correction curves to the color correction unit 4 on the basis of the decision result input from the correction necessity decision unit 5, and the color correction unit 4 carries out the color correction by using the color correction curves input from the color correction curve generating unit 3. But in another possible structure, the color correction curve generating unit 3 outputs the decision result input from the correction necessity decision unit 5, together with both the color correction curves for making the color correction and the color correction curves for leaving the colors unchanged, the latter curves being the lines with unity slope, to the color correction unit 4, and the correction necessity decision unit 5 outputs its decision result to the color correction unit 4, and on the basis of the decision result input from the correction necessity decision unit 5, the color correction unit 4 selects the color correction curves to be used to carry out the color correction. In this case, if the decision result is that the correction is 'necessary', the color correction curves for carrying out the color correction are selected; if the decision result is that the correction is 'unnecessary', the color correction curves which are the lines with unity slope are selected.

The correction necessity decision unit 5 is configured to decide whether or not to carry out the correction on the input image. But a configuration in which the correction necessity decision unit 5 is not provided and whether or not the correction is necessary is input from the outside to the color correction curve generating unit 3 is also possible.

In the structure in FIG. 9, the correction necessity decision unit 5 includes both the uniform region detection unit 51 and the hue skew detection unit 52. But it may include only one of them. If it includes the uniform region detection unit 51, for example, a decision not to carry out the color correction may be made when the presence of a uniform region is inferred (when an absolute difference value is determined to exceed a prescribed threshold value). If it includes only the hue skew detection unit 52, a decision not to carry out the color correction may be made when hue skew is detected (when a missing hue region with a width larger than a prescribed width is detected).

The invention has been described as an image processing apparatus above, but the image processing method carried out by the image processing apparatus also forms part of the invention. Some or all of the elements constituting the image processing apparatus and some or all of the steps constituting the image processing method may be implemented in software, that is, by a programmed computer; a program causing a computer to execute the processing of the components in the image processing apparatus or the processing in the steps of the image processing method and a computer readable recording medium in which the program is stored also form parts of the invention.

REFERENCE CHARACTERS 1 gradation histogram calculation unit, 2 maximum/minimum calculation unit, 3 color correction curve generating unit, 4 color correction unit, 5 correction necessity decision unit, 51 uniform region detection unit, 52 hue skew detection unit, 53 consolidated decision unit, 511r, 511g, 511b absolute difference calculation unit, 512r, 512g, 512b absolute difference comparison unit, 513 decision unit, 514r, 514g, 514b counting unit, 515r, 515g, 515b count comparison unit, 516 decision unit, 521 hue calculation unit, 522 hue histogram calculation unit, 523 missing range detection unit, 524 range width comparison unit.

What is claimed is:

1. An image processing apparatus comprising:
a gradation histogram calculation unit for calculating gradation histograms of respective color components of an image signal including a plurality of color components and forming a single image;
a maximum/minimum calculation unit for calculating a maximum value and a minimum value of classes of each color component by using the gradation histogram of each color component;
a color correction curve generating unit for finding, as an all-color maximum value, a largest value among the maximum values calculated by the maximum/minimum calculation unit for the respective color components and, on a basis of the maximum values and the minimum values of the respective color components and the all-color maximum value, generating color correction curves for the color components other than the color component whose maximum value is equal to the all-color maximum value; and
a color correction unit for performing corrections on the respective color components of the image signal by using the color correction curves; wherein
when differences among the maximum values calculated by the maximum/minimum calculation unit for the respective color components are smaller than a prescribed value, the color correction curve generating unit finds, as an all-color minimum value, a smallest value among the minimum values calculated by the maximum/minimum calculation unit for the respective color components and, on a basis of the maximum values and the minimum values of the respective color components and the all-color minimum value, generates color correction curves for the color components other than the color component whose minimum value is equal to the all-color minimum value such that, after the corrections, the minimum value of each color component is substantially equal to the all-color minimum value.

2. The image processing apparatus of claim 1, further comprising a correction necessity decision unit for using the image signal, and the gradation histograms calculated for the respective color components by the gradation histogram calculation unit to make a decision as to whether or not to correct the image, wherein the color correction curve generating unit generates the color correction curves on a basis of a result of the decision made by the correction necessity decision unit.

3. The image processing apparatus of claim 2, wherein the correction necessity decision unit calculates absolute differences between frequencies of mutually adjacent classes in the gradation histograms, and decides not to correct the image signal when at least a prescribed number of the absolute differences are determined to exceed a prescribed threshold value.

4. The image processing apparatus of claim 3, wherein the correction necessity decision unit determines whether the absolute differences between the frequencies of mutually adjacent classes in a range excluding a minimum class and a maximum class in the gradation histograms exceed the prescribed threshold value.

5. The image processing apparatus of claim 3, wherein the image signal includes a red component signal, a green component signal, and a blue component signal, and the correction necessity decision unit determines whether the absolute differences between the frequencies of mutually adjacent classes exceed the prescribed threshold value in the gradation histogram only of the green component signal, among the red component signal, the green component signal, and the blue component signal.

6. The image processing apparatus of claim 2, wherein the correction necessity decision unit decides not to correct the image signal when it determines that a hue distribution of the image signal is greatly skewed.

7. The image processing apparatus of claim 6, wherein the correction necessity decision unit decides not to correct the image signal when a range of missing hues with a prescribed width or more is detected.

8. The image processing apparatus of claim 4, wherein the image signal includes a red component signal, a green component signal, and a blue component signal, and the correction necessity decision unit determines whether the absolute differences between the frequencies of mutually adjacent classes exceed the prescribed threshold value in the gradation histogram only of the green component signal, among the red component signal, the green component signal, and the blue component signal.

9. The image processing apparatus of claim 3, wherein the correction necessity decision unit decides not to correct the image signal when it determines that a hue distribution of the image signal is greatly skewed.

10. The image processing apparatus of claim 4, wherein the correction necessity decision unit decides not to correct the image signal when it determines that a hue distribution of the image signal is greatly skewed.

11. The image processing apparatus of claim 5, wherein the correction necessity decision unit decides not to correct the image signal when it determines that a hue distribution of the image signal is greatly skewed.

12. An image processing method for producing a color corrected image signal for display on a display, the image processing method being performed by a digital computer under control of a non-transitory program, the method comprising:
    calculating gradation histograms of respective color components of an image signal including a plurality of color components and forming a single image;
    calculating a maximum value and a minimum value of classes of each color component by using the gradation histogram of each color component;
    finding, as an all-color maximum value, a largest value among the maximum values calculated for the respective color components and, on a basis of the maximum values and the minimum values of the respective color components and the all-color maximum value, generating color correction curves for the color components other than the color component whose maximum value is equal to the all-color maximum value; and
    performing corrections on the respective color components of the image signal by using the color correction curves; wherein
    when differences among the maximum values calculated for the respective color components are smaller than a prescribed value, a smallest value among the minimum values calculated for the respective color components is found as an all-color minimum value, and, on a basis of the maximum values and the minimum values of the respective color components and the all-color minimum value, color correction curves are generated for the color components other than the color component whose minimum value is equal to the all-color minimum value such that, after the corrections, the minimum value of each color component is substantially equal to the all-color minimum value.

13. A non-transitory computer readable recording medium storing a program for causing a computer to execute the steps in the image processing method of claim 12.

* * * * *